United States Patent [19]
Akimaru

[11] Patent Number: 6,082,095
[45] Date of Patent: Jul. 4, 2000

[54] FUEL SUPPLY CONTROL UNIT FOR GAS TURBINE

[75] Inventor: Satoru Akimaru, Yoshikawa, Japan

[73] Assignee: Kabushiki Kaisha Toshiba, Kawasaki, Japan

[21] Appl. No.: 09/258,308

[22] Filed: Feb. 26, 1999

Related U.S. Application Data

[62] Division of application No. 08/773,321, Dec. 24, 1996, Pat. No. 5,899,073.

[30] Foreign Application Priority Data

Dec. 26, 1995 [JP] Japan ................................. 7-339220

[51] Int. Cl.⁷ ...................................................... F02C 3/22
[52] U.S. Cl. ............................................ 60/39.465; 60/734
[58] Field of Search .......................... 60/39.091, 39.281, 60/39.465, 734, 736

[56] References Cited

U.S. PATENT DOCUMENTS

| | | | |
|---|---|---|---|
| 2,599,480 | 6/1952 | Phenninger | 60/39.465 |
| 4,087,961 | 5/1978 | Avery | 60/39.465 |
| 5,609,016 | 3/1997 | Yamada | 60/39.465 |

FOREIGN PATENT DOCUMENTS

60-192837  10/1985  Japan .

*Primary Examiner*—Louis J. Casaregola
*Attorney, Agent, or Firm*—Oblon, Spivak, McClelland, Maier & Neustadt, P.C.

[57] ABSTRACT

A fuel supply control unit for a gas turbine includes a fuel supply system for sending fuel in a fuel reservoir to a plurality of gas turbine combustors, a heater provided for the fuel supply system for heating the fuel, a pressure reducing valve and an inlet fuel cutoff valve disposed on a downstream side of the heater, and a pressure reducing valve controller which detects an inlet fuel pressure of the inlet fuel cutoff valve and which supplies a pressure reduction control signal to the pressure reducing valve if a detected fuel pressure is higher than a required fuel pressure of the gas turbine.

2 Claims, 9 Drawing Sheets

FUEL SUPPLY CONTROL UNIT FOR GAS TURBINE

This application is a Division of application Ser. No. 08/773,321 Filed on Dec. 24, 1996, now U.S. Pat. No. 5,899,073.

BACKGROUND OF THE INVENTION

The present invention relates to a fuel supply apparatus for a gas turbine and a control unit for the same adapted to adjust the fuel supplied from a fuel reservoir so as to provide appropriate temperature and pressure before the fuel is sent to a gas turbine combustor.

Figure 13:
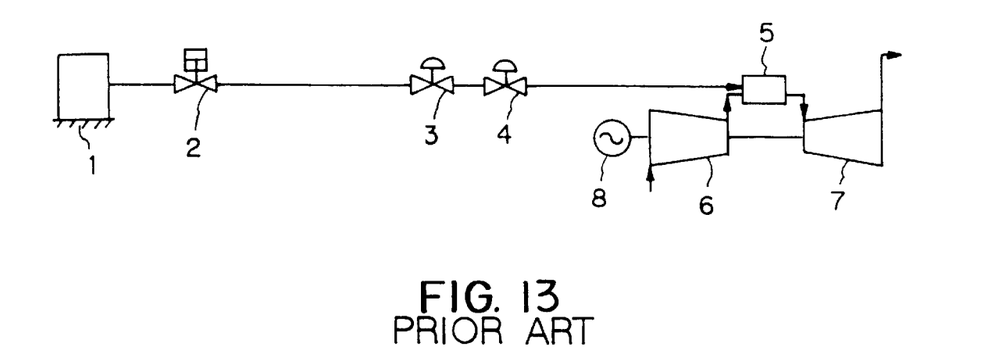
FIG. 13 is a schematic diagram showing a conventional example wherein a single power station receives fuel supplied from a single fuel reservoir.

In general, as shown in FIG. 13, the fuel supply apparatus in practical use for a gas turbine having an output of 100 MW or less is designed to feed such fuel as liquid natural gas (LNG) or other gaseous fuel from a fuel reservoir 1 to a gas turbine combustor 5 via a fuel emergency cutoff valve 2, a gas turbine inlet fuel cutoff valve 3 and a fuel flow regulating valve 4. In the combustor 5, high-pressure air from a compressor 6 which sucks in atmospheric air to generate the high-pressure air is added to the gaseous fuel to produce a combustion gas which is then fed as a working fluid to a gas turbine 7 where it performs expansion work. The rotating torque obtained by the expansion work is used to run a generator 8 to provide electrical output.

Hitherto, in this type of gas turbine in actual use to provide electrical output, the fuel pressure at the time of feeding the fuel from the fuel reservoir 1 to the gas turbine combustor 5 has been given by an expression (1) shown below, taking into account various losses and the pressure balance of the high-pressure air supplied by the compressor 6.

$$P = P1 + P2 + P3 \quad (1)$$

where P denotes a fuel pressure required by the gas turbine 7, P1 denotes the discharge pressure of the compressor 6, P2 denotes a pressure loss of the gas turbine combustor 5 including a fuel nozzle, etc., and P3 denotes various losses of a fuel supply piping system.

Typically, a proper fuel pressure required by the gas turbine 7 which is calculated based on the above expression (1) is ranged from 20 to 25 atg.

Figure 14:
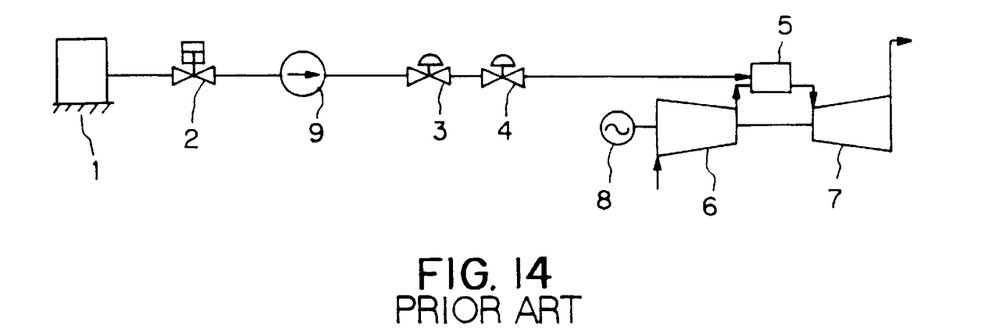
FIG. 14 is a schematic diagram showing a conventional example wherein a booster is provided between a power station and a fuel reservoir.

Although the required fuel pressure values shown above may be appropriate, if any accidental situation should break out, it becomes difficult to generate combustion gas in the gas turbine combustor 5. For this reason, in some cases, a booster 9 is provided at the inlet end of the gas turbine inlet fuel cutoff valve 3 as emergency corrective measures as illustrated in FIG. 14.

Figure 12:
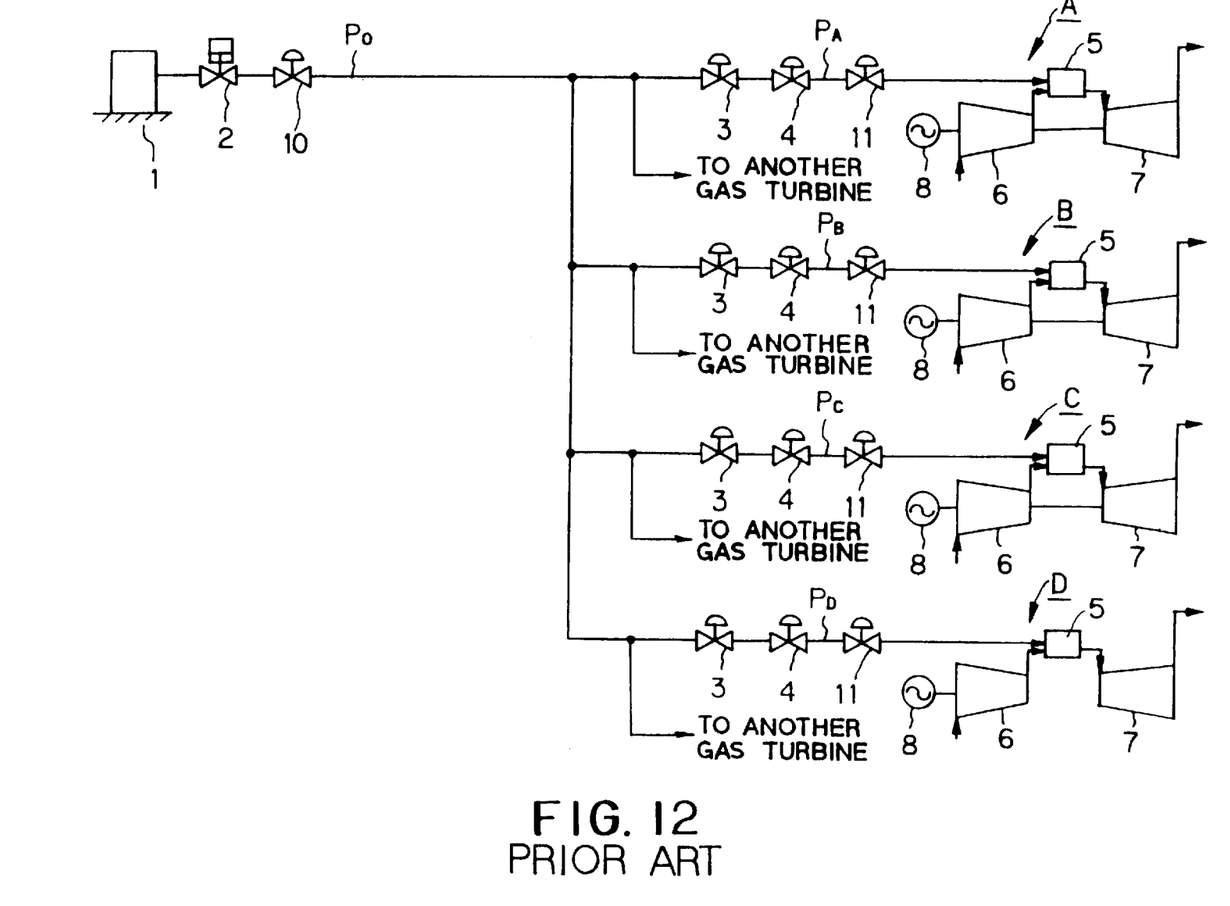
FIG. 12 is a schematic diagram showing a conventional example wherein a plurality of power stations receive fuel supplied from a single fuel reservoir.

In recent years, more power stations are combined with electric power plants which combine a plurality of gas turbine power plants or combine gas turbines with steam turbines in the same premises or in separated premises as shown in FIG. 12 for the purpose of effective use of land. With this trend, the fuel reservoirs for the aggregate power plants are also being integrated. From the viewpoint of an environmental preservation, gaseous fuels such as LNG is frequently used.

When feeding fuel from the single fuel reservoir 1 to power stations A, B, . . . , in order to set the fuel pre-pressure of the gas turbine combustors 5, 5, . . . , of the power stations A, B, . . . , (i.e. the fuel pressure required by the gas turbines) to PA, PB, . . . , an original fuel pressure P0 is determined with the loss of the piping system taken into consideration. The original fuel pressure P0 is adjusted by a pressure regulating valve 10.

The original fuel pressure P0 is decided based on a fuel pre-pressure PD required by the gas turbine combustor 5 of a power station which is located farthest from the fuel reservoir 1, and the fuel pre-pressures PA, PB, . . . , vary depending on the operating situations of the power stations A, B, . . . .

For instance, in an operation mode wherein the power station A is halted, the power station B and a power station C are partially loaded, and a power station D is fully loaded. The fuel pre-pressure of the gas turbine combustors 5, 5, 5, . . . , of the power stations B, C, D, . . . , will be the required value or higher since the supply of fuel to the power station A has been cut off. Hence, there is a demand for reducing the fuel pressure in the operation by providing pressure reducing valves 11, 11, . . . , to obtain the required fuel pre-pressure of the gas turbine combustors 5, 5, 5, . . . , of the power stations B, C, D, . . . .

To adjust the fuel pre-pressure of a gas turbine combustor, the fluctuation in load on the gas turbine can be dealt with satisfactorily by the pressure regulating valve 10 regardless of provision of the booster as long as there is only one combustor. If, however, each gas turbine combustor of a plurality of power stations is required to perform the operation in which the fuel pressure is reduced, then the following several problems are posed.

(1) When reducing the pressure of fuel, excessive reduction of the pressure would cause the saturation temperature of the fuel to drop due to the Joule-Thomson effect, thus accelerating the liquefaction of the fuel. Thus, when the combustion gas is generated in the gas turbine combustor, the rich part of the fuel is unevenly distributed, causing the combustion gas to locally develop an abnormally high temperature. Consequently, a high concentration of NOx may result, the nozzle may be damaged by the local abnormal high temperature at the fuel nozzle portion, or the combustion gas which has locally developed the abnormally high temperature may be generated in the gas turbine 7 and flows through the gas turbine 7, burning the stationary blades or moving blades thereof.

Further, in the case of the fuel rich, since the combustion temperature temporarily increases, it is required to throttle the fuel, and in such case, if a time lag exists, supply pressure in the fuel supply line may be reduced and a back-fire may be caused to the fuel system, which will results in the burning to the upsteam side of the fuel system.

(2) When performing the operation in which the fuel pressure is reduced, the pulsation of the fuel which takes place each time the pressure reducing valve 11 is opened or closed affects the opening or closing of the gas turbine inlet fuel cutoff valve 3 or the fuel flow regulating valve 4. This causes a valve rod to be hunched, leading to a possibility of breaking it. Further, in case of an emergency such as a first cutback operation (isolated operation in a power station), the pressure of the fuel itself considerably changes and there is a danger that the combustion gas in the gas turbine combustor may develop a flameout in some cases. Furthermore, in the case of the fuel rich, since the combustion temperature temporarily increases, there is a feat that a combustor liner, a transition piece, and movable and stationary blades of the gas turbine may be burnt and hence damaged.

SUMMARY OF THE INVENTION

It is a primary object of the present invention is to substantially eliminate defects or drawbacks encountered in the prior art described above and to provide a fuel supply apparatus for a gas turbine and a control unit for the same which adjusts fuel to have appropriate pressure and temperature before feeding the fuel to a gas turbine combustor in performing the operation in which fuel is heated and reduced in pressure for the gas turbine.

It is another object of the present invention to provide a fuel supply apparatus for the gas turbine and a control unit for the same which preheats fuel before reducing the pressure thereof, successfully processes steam or hot water serving as a heating source for the preheating and successfully processes noncondensable gas and drain which are generated during the heating in performing the fuel pressure reducing operation for the gas turbine.

It is a further object of the present invention to provide a fuel supply apparatus for the gas turbine and a control unit for the same which preheats fuel before reducing the pressure thereof and which automatically and securely takes corrective action even if the fuel leaks during the heating process in performing the fuel pressure reducing operation for the gas turbine.

It is a still further object of the present invention to provide a fuel supply apparatus for the gas turbine and a control unit for the same which is capable of taking successful, quick action to supply a required fuel pressure of the gas turbine even if the reduced pressure of the fuel is not appropriate in performing the fuel pressure reducing operation for the gas turbine.

It is a still further object of the present invention to provide a fuel supply apparatus for the gas turbine and a control unit for the same which provides a component equipment of a fuel supply system with sufficient rustproof measures while the gas turbine is at rest.

These and other objects can be achieved according to the present invention by providing, in one aspect, a fuel supply apparatus for a gas turbine comprising:
- a fuel supply system for sending fuel in a fuel reservoir to a plurality of gas turbine combustors;
- a heater provided for the fuel supply system for heating the fuel;
- a pressure reducing means for reducing a pressure of the fuel, which has been heated, according to a required fuel pressure of a gas turbine; and
- a surge tank absorbing a change of the fuel pressure after the pressure reduction.

The pressure reducing means comprises at least either one or more of pressure reducing valves and orifices, and the pressure reducing valves are divided into a large pressure reducing valve and a small pressure reducing valve, which are disposed in parallel to each other. The orifices are also divided into a large diameter orifice and a small diameter orifice, which are disposed in parallel to each other.

In another aspect, there is provided a fuel supply apparatus for a gas turbine comprising:
- a fuel supply system for sending fuel in a fuel reservoir to a plurality of gas turbine combustors;
- a heater provided for the fuel supply system for heating the fuel;
- a heating medium supply system provided for the heater for supplying a heating medium serving as a heating source for the fuel;
- a vent system provided for the heater for releasing a noncondensable gas, which is generated during the heating of the fuel, out of the heater; and
- a drain system provided for to the heater for discharging a drain, which is generated during the heating of the fuel, out of the heater.

The heating medium supplied to the heater is either one of steam and hot water.

In a further aspect, there is provided a fuel supply apparatus for a gas turbine comprising:
- a fuel supply system for sending fuel in a fuel reservoir to a plurality of gas turbine combustors;
- a heater provided for the fuel supply system for heating the fuel; and
- an inert gas supply system for supplying an inert gas to the heater while the heater is in a non-operational mode.

The inert gas is either one of nitrogen gas and argon gas.

In a still further aspect of the present invention, there is provided a fuel supply control unit for a gas turbine comprising:
- a fuel supply system for sending fuel in a fuel reservoir to a plurality of gas turbine combustors;
- a heater provided for the fuel supply system for heating the fuel;
- a pressure reducing means and a gas turbine combustor inlet fuel cutoff valve means disposed downstream side of the heater; and
- a pressure reducing means controller which detects an inlet fuel pressure of the gas turbine combustor inlet fuel cutoff valve means and applies a pressure reduction control signal to the pressure reducing means if a detected pressure is higher than a required fuel pressure of the gas turbine.

The pressure reducing means controller includes a comparator which compares a signal of an actual inlet fuel pressure of the gas turbine combustor inlet fuel cutoff valve with a signal of the required fuel pressure of the gas turbine and an operation unit which produces the pressure reduction signal to the pressure reducing means in accordance with a deviation through the comparison given by the comparator.

In a still further aspect, there is provided a fuel supply control unit for a gas turbine comprising:
- a fuel supply system for sending fuel in a fuel reservoir to a plurality of gas turbine combustors;
- a heater provided for the fuel supply system for heating the fuel;
- a pressure reducing means disposed downstream side of the heater; and
- a heating medium controller which detects the fuel pressure and the fuel temperature on the downstream side of the pressure reducing means and supplies a valve open/close signal to a heating medium regulating valve of a heating medium supply system which supplies a heating medium to the heater in accordance with a signal of the detected pressure and a signal of the detected temperature.

The heating medium controller comprises a function device for calculating a saturation temperature of the fuel in accordance with a signal of an actual fuel pressure on the downstream side of the pressure reducing means, a comparator for comparing an output signal from the function device with a signal of an actual fuel temperature which has been detected from the downstream side of the pressure reducing means, and an operation unit which supplies a valve open/close signal to the heating medium regulating valve according to a deviation given from the comparator through the comparison.

In a still further aspect, there is provided a fuel supply control unit for a gas turbine comprising:
- a fuel supply system for sending fuel in a fuel reservoir to a plurality of gas turbine combustors;
- a heater provided for the fuel supply system for heating the fuel;

a pressure reducing means disposed downstream side of the heater; and a heating medium controller which detects an actual fuel temperature on the downstream side of the pressure reducing means and supplies a valve open/close signal to a heating medium regulating valve in a heating medium supplying system which supplies a heating medium to the heater.

The heating medium controller comprises a comparator which compares a signal of an actual fuel temperature on the downstream side of the pressure reducing means with a signal of a preliminarily set temperature signal from a temperature setter and an operation unit which produces a valve open/close signal to the heating medium regulating valve in accordance with a deviation between the compared signals in the comparator.

The set temperature signal of the temperature setter is set to a value higher than a dew point of a fuel corresponding to the fuel supply pressure at the inlet of the gas turbine.

In a still further aspect, there is provided a fuel supply control unit for a gas turbine comprising:

a fuel supply system for sending fuel in a fuel reservoir to a plurality of gas turbine combustors;

a heater provided for the fuel supply system for heating the fuel;

a pressure reducing means disposed downstream side of the heater; and a heating medium controller which detects an actual fuel pressure, an actual fuel temperature on the downstream side of the pressure reducing means and an inner pressure in the heater and supplies a valve open/close signal to a heating medium regulating valve in a heating medium supply system which supplies a heating medium to the heater in accordance with a detected actual fuel pressure signal, a detected actual fuel temperature signal and a detected inner pressure signal.

The heating medium controller comprises a function device for calculating a saturation temperature of the fuel in accordance with a signal of an actual fuel pressure on the downstream side of the pressure reducing means, a comparator for comparing an output signal from the function device with a signal of an actual fuel temperature which is detected from the downstream side of the pressure reducing means, an operation unit which supplies a valve open/close signal to the heating medium regulating valve according to a deviation given from the comparator, and a limiting means for limiting the valve opening degree of the heating medium regulating valve by adding a valve opening degree signal created in response to the inner pressure signal of the heater. A valve opening degree limiting signal from the valve opening degree limiting means is created by comparing inner pressure signal of the heater with a preliminarily set pressure signal set to a pressure more than atmospheric pressure by a pressure setter and producing a deviation signal representing a deviation between the compared signals.

In a still further aspect, there is provided a fuel supply control unit for a gas turbine comprising:

a fuel supply system for sending fuel in a fuel reservoir to a plurality of gas turbine combustors;

a heater provided for the fuel supply system for heating the fuel;

a pressure reducing valve means disposed downstream side of the heater; and an inlet fuel cutoff valve means disposed on an inlet side of the gas turbine combustor; and a fuel controller adapted to detect an actual fuel pressure in either one of an actual fuel pressure on the downstream side of the pressure reducing valve means and an actual inlet side fuel pressure of the gas turbine combustor inlet fuel cutoff valve means, to supply a valve opening signal to a fuel emergency relief valve which is provided on an inlet side of the gas turbine combustor inlet fuel cutoff valve if the detected pressure is higher than a required fuel pressure of the gas turbine or to supply a valve closing signal to the fuel emergency relief valve, and to supply a valve closing signal to a fuel cutoff valve means provided between the heater and the pressure reducing valve means if the detected pressure is continuously higher than the required fuel pressure of the gas turbine even after the fuel emergency relief valve was opened or closed.

The fuel controller comprises a comparator which compares either one of a signal of the actual fuel pressure on the downstream side of the pressure reducing valve means and a signal of the actual inlet fuel pressure of the gas turbine inlet fuel cutoff valve means with a signal of the required fuel pressure of the gas turbine, an operation unit adapted to supply a valve opening signal to the fuel emergency relief valve means in accordance with a deviation given by said comparator, and another operation unit adapted to supply a valve closing signal to the fuel cutoff valve means via a timer circuit if the signal of the actual fuel pressure is still higher than the required fuel pressure of the gas turbine even after the fuel emergency relief valve means was opened.

In a still further aspect, there is provided a fuel supply control unit for a gas turbine comprising:

a fuel supply system for sending a fuel in a fuel reservoir to a plurality of gas turbine combustors;

a heater provided for the fuel supply system for heating the fuel;

an inert gas supply system provided for the heater for supplying an inert gas during a non-operational mode of the heater; and an inert gas controller provided for supplying a valve opening signal to an inert gas emergency cutoff valve means and an inert gas regulating valve means which are provided to the inert gas supply system when a pressure in the heater comes down below an atmospheric pressure.

The inert gas controller comprises a comparator for detecting the pressure in the heater and comparing a signal of the detected pressure in the heater with a signal of the atmospheric pressure, an operation unit which generates a signal for opening the inert gas emergency cutoff valve means and the inert gas regulating valve means when the signal of the detected pressure in the heater indicates a zero or negative deviation in comparison with the signal of the atmospheric pressure, and an AND circuit which supplies a signal for opening the inert gas emergency cutoff valve means and the inert gas regulating valve means on condition that both the valve opening signals from the operation unit and a non-operational mode signal from the heater are issued.

In a still further aspect, there is provided a fuel supply control unit for a gas turbine comprising:

a fuel supply system for sending a fuel in a fuel reservoir to a plurality of gas turbine combustors;

a heater provided for the fuel supply system for heating the fuel;

a heating medium supply system provided for the heater for supplying a heating medium; and a drain controller which supplies a valve open/close signal to a drain regulating valve means of a drain system provided for the heater when a drain generated during a heat exchange between the heating medium from the heating medium supply system and the fuel from the fuel reservoir exceeds a predetermined level.

The drain controller comprises a comparator which detects a water level in the heater and compares a signal of the detected water level in the heater with a predetermined value and an operation unit which supplies a valve open/close signal to the drain regulating valve means in accordance with a deviation between the detected signal and the predetermined value given by the comparator.

In a still further aspect, there is provided a fuel supply control unit for a gas turbine comprising:

a fuel supply system for sending fuel in a fuel reservoir to a plurality of gas turbine combustors;

a heater provided for the fuel supply system for heating the fuel;

a heating medium supply system for supplying a heating medium to the heater as a fuel heating source;

a vent system for releasing a noncondensable gas generated during the heating of the fuel out of the heater;

a drain system for discharging a drain generated during the heating of the fuel out of the heater;

an inert gas supply system for supplying an inert gas during a non-operational mode of the heater; and a fuel leakage emergency processing controller provided for supplying a valve closing signal to a main valve provided on the fuel supply system, the heating medium emergency cutoff valve means provided to a heating medium supply system, a drain emergency cutoff valve means provided to the drain system, a vent emergency cutoff valve means provided to the vent system, and an inert gas emergency cutoff valve means provided to the inert gas supply system, respectively, and further supplying a valve opening signal to a noncondensable gas vent relief valve means provided to the vent system when either one of a fuel leakage detector provided to the vent system and a pressure switch provided to the heater detects a fuel leakage in the heater during the heat exchange between the fuel and the heating medium.

The fuel leakage emergency processing controller comprises a comparator which detects a leak fuel pressure of the vent system or the pressure in the heater and compares a signal of either one of the detected pressure with a predetermined pressure and an operation unit which supplies the valve closing signal to a fuel main valve, the heating medium emergency cutoff valve means, the drain emergency cutoff valve means, the vent emergency cutoff valve means and the inert gas emergency cutoff valve means and also supplies a valve opening signal to the noncondensable gas vent relief valve means in accordance with a deviation between the detected pressure and the predetermined pressure given by the comparator.

According to the fuel supply apparatus for a gas turbine of the present invention described above, the fuel supply system is provided with the heater and pressure reducing valves for reducing fuel pressure for the gas turbine. The fuel is adjusted to have appropriate pressure and temperature according to the required fuel pressure of the gas turbine before the fuel is fed to a gas turbine combustor, thus making it possible to prevent the fuel from partially liquefying due to the pressure reduction.

Further, in the fuel supply apparatus for the gas turbine according to the present invention, the heating medium supply system is provided as the heating source to heat the fuel by the heater, and the drain system and the vent system for processing the drain and the noncondensable gas produced during the fuel heating process are also provided, thus permitting successful heating of fuel.

Furthermore, in the fuel supply apparatus for the gas turbine according to the present invention, the heater is equipped with the inert gas supply system to protect the heater from rusting while the heater is in a non-operational mode, thus preventing foreign matters from getting into fuel.

Furthermore, in the fuel supply control unit for the gas turbine according to the present invention, the pressure reducing valves or orifices are provided with the pressure reducing valve controller to control the fuel pressure of the fuel supply system in reducing the fuel pressure for the gas turbine. Therefore, even if the fuel pressure of the fuel supply system is higher than the required fuel pressure of the gas turbine, the fuel pressure of the fuel supply system can be adjusted to the required fuel pressure of the gas turbine.

Moreover, in the fuel supply control unit for the gas turbine according to the present invention, the heating medium supply system of the heater is provided with a heating medium controller to control the volume of the heating medium so that the temperature of the fuel is the saturation temperature of the fuel itself or higher in heating the fuel and reducing the pressure of the fuel. Therefore, the fuel, the pressure of which has been reduced through the pressure reducing valves, does not liquefy.

In addition, in the fuel supply control unit for the gas turbine according to the present invention, the fuel controller is provided for reducing the pressure of fuel, so that, even if the pressure of the fuel which has been reduced by the pressure reducing valves is not appropriate and the fuel pressure is still higher than the required fuel pressure of the gas turbine, proper processing can be performed on the fuel, thus protecting the gas turbine from being adversely affected.

Furthermore, in the fuel supply control unit for the gas turbine according to the present invention, the heater for heating fuel is provided with the inert gas supply system and the inert gas controller therefor so as to control the volume of the inert gas fed from the inert gas supply system to the heater to a proper level while the heater is in a non-operational mode, thus permitting secure protection of the heater from rust.

Further, in the fuel supply control unit for the gas turbine according to the present invention, the heater is provided with the drain controller for heating fuel so as to control the level of the drain generated while heating the fuel to a proper level. Therefore, the drain in the heater does not increase to an abnormal level, thus permitting successful heating of the fuel.

Furthermore, the fuel supply control unit for the gas turbine according to the present invention is provided with the fuel leakage emergency processing controller, so that if fuel leakage occurs in the heater during the heating of the fuel, the fuel leakage emergency processing controller issues the command to supply the valve closing signal to the fuel main valve of the fuel supply system, the heating medium emergency cutoff valve of the heating medium supply system, the drain emergency cutoff valve of the drain system, the vent emergency cutoff valve of the vent system, and the inert gas emergency cutoff valve of the inert gas supply system and also to supply the valve opening signal to the noncondensable gas vent relief valve of the vent system so as to perform proper processing, thus protecting the foregoing respective systems from adverse influences.

Still furthermore, according to the fuel supply system of the present invention, when the fuel is supplied to the gas turbine combustor under the no supply condition of the heating medium from the heating medium supply system to the heater, and when the inner pressure of the heater becomes negative, the heating medium is supplied by giving limitation to the valve opening degree of the heating medium regulating valve to thereby maintain the inner pressure of the heater to a pressure more than the atmospheric pressure and hence to prevent the air from invading into the heater. Such operation is performed by the heating medium controller.

The present invention will be made further clear from the following descriptions made with reference to the accompanying drawings representing preferred embodiment of the present invention.

DESCRIPTION OF THE PREFERRED EMBODIMENTS

A first embodiment of a fuel supply apparatus for a gas turbine and a control unit for the same according to the present invention will be described hereunder with reference to the accompanying drawings. The fuel is fed from a single fuel reservoir to a plurality of gas turbines. In this embodiment, however, only one gas turbine is mentioned with respect to a single fuel reservoir.

Figure 1:
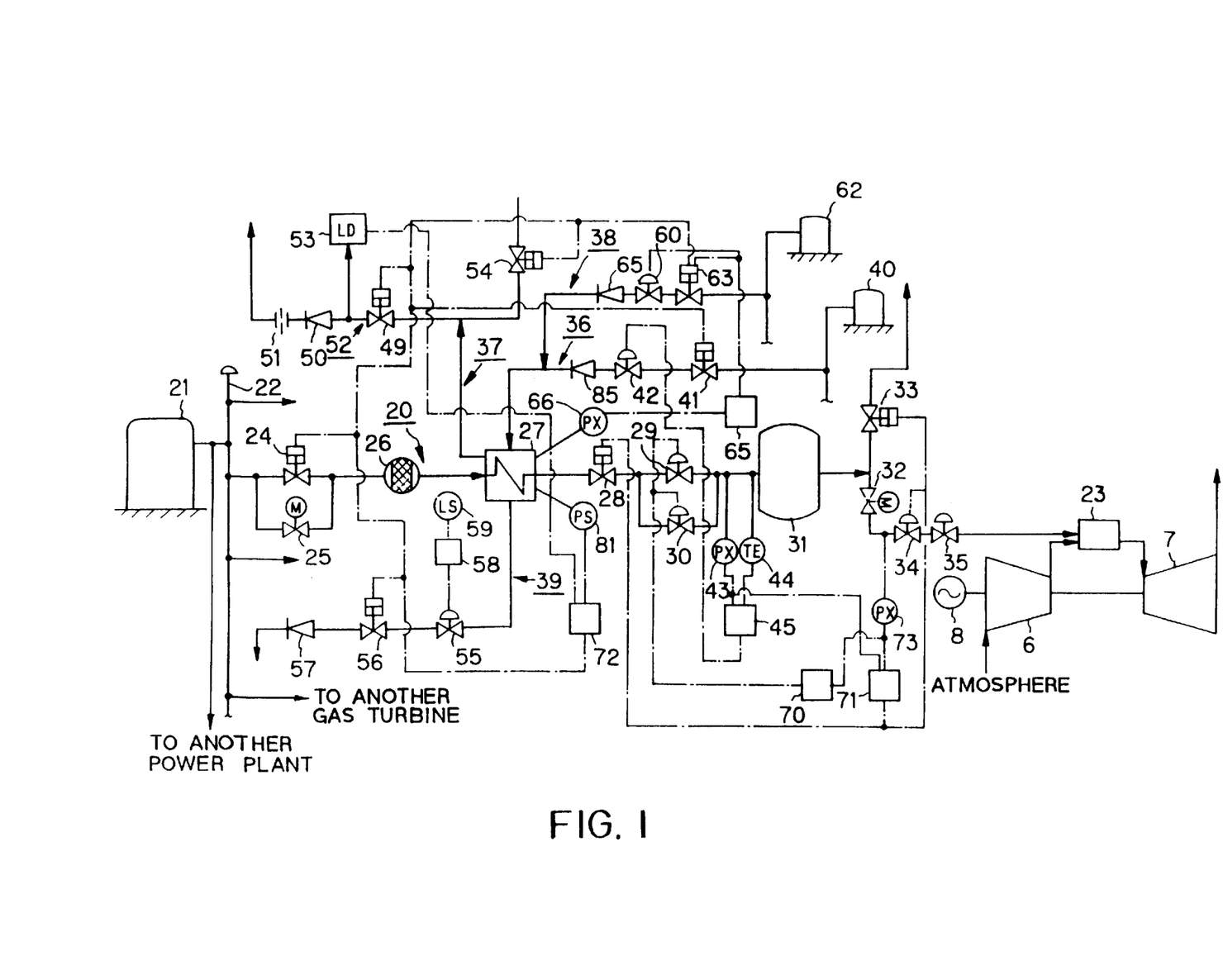
FIG. 1 is a schematic system diagram illustrative of a fuel supply apparatus for a gas turbine and a control unit for the same according to a first embodiment of the present invention.

FIG. 1 is a schematic system diagram showing a fuel supply apparatus for a gas turbine and a control unit according to the first embodiment of the present invention.

A fuel supply system which is generally indicated by a reference numeral 20 feeds a fuel such as LNG or other gaseous fuel in a fuel reservoir 21 to a gas turbine combustor 23 via a header 22. The fuel supply system 20 is equipped with a fuel main valve 24, a bypass valve 25 located in parallel to the fuel main valve 24, a strainer 26, and a heater 27 along the flow of the fuel distributed from the header 22.

Prior to start of operation, when sending the fuel from the fuel reservoir 21 to the fuel supply system 20, because the fuel itself has high pressure, there is a possibility that water hammer phenomenon takes place under the high pressure of the fuel. The bypass valve 25 which is provided in parallel to the fuel main valve 24 is intended to let a very small amount of fuel flow into the gas turbine combustor 23 in order to protect all component units of the fuel supply system 20 from being damaged if such water hammer phenomenon occurs. The strainer 26 is provided to prevent an impurity mixed in the fuel, if any, from flowing into the gas turbine combustor 23. The heater 27 preheats the fuel to prevent the fuel from partially liquefying when reducing the pressure of the fuel to a fuel pressure level required by the gas turbine 7 to match the load thereon.

Provided on the downstream side of the heater 27 is a surge tank 31 via a fuel cutoff valve 28, and a large pressure reducing valve 29, and a small pressure reducing valve 30, having a diameter smaller than that of the large pressure reducing valve 29, are also installed in parallel. The fuel cutoff valve 28 serves to cut off the supply of the fuel from the fuel reservoir 21 if the pressure of the fuel remains higher than the fuel pressure required by the gas turbine 7 even after the pressure of the fuel has been reduced by the large pressure reducing valve 29 and the small pressure reducing valve 30. The large pressure reducing valve 29 which has the large diameter and the small pressure reducing valve 30 which has the small diameter are provided because of the following reason. That is, if there is an excessively large difference between the fuel pressure required by the gas turbine 7 and the fuel pressure supplied from the fuel reservoir 21, the pressure of the fuel is first gradually reduced through the small pressure reducing valve 30 having the small diameter, and then the fuel pressure is reduced down to the fuel pressure required by the gas turbine 7 by using both the small pressure reducing valve 30 having the small diameter and the large pressure reducing valve 29 having the large diameter so as to prevent the occurrence of water hammer phenomenon or the like caused by a sudden change in the fuel pressure, thus protecting the component units from being damaged. Further, the large pressure reducing valve 29 may be substituted with a large orifice member and the small pressure reducing valve 30 may be also substituted with a small orifice member having a diameter smaller than that of the large orifice. Furthermore, the surge tank 31 functions to restrain as much as possible the fuel pulsation which takes place at the time of startup or first cutback operation of the gas turbine 7, or when the fuel flow-pressure of the fuel supply system 20 suddenly changes, although it is transitional, and the sudden change is too heavy for the large pressure reducing valve 29 and the small pressure reducing valve 30 to handle, or the fuel pulsation which takes place when the opening of the large pressure reducing valve 29 and the small pressure reducing valve 30 is restricted excessively.

The downstream side of the surge tank 31 is branched in the middle, and provided on one end thereof is a fuel emergency relief valve 33 which communicates with atmospheric air and provided on the other end thereof are a stop valve 32 connected to the gas turbine combustor 23, a gas turbine inlet fuel cutoff valve 34, and a gas turbine inlet fuel regulating valve 35. The fuel emergency relief valve 33 functions to let a part of fuel into the atmospheric air if the fuel pressure remains still higher than the required fuel pressure of the gas turbine 7 even after the fuel pressure has been reduced by the large pressure reducing valve 29 and the small pressure reducing valve 30, and the fuel emergency relief valve 33 is closed at a time when the fuel pressure lowers in accordance with the required fuel pressure of the gas turbine 7. The stop vale 32 provides isolation from the gas turbine combustor 23 when supplying the inert gas to the heater 27 or supplying the fuel in the fuel reservoir 21 to the fuel supply system 20 prior to the start of the operation as it will be discussed later. The gas turbine inlet fuel cutoff valve 34 cuts off the fuel to the gas turbine combustor 23 if an accident happens in the gas turbine 28, and the gas turbine inlet fuel regulating valve 35 controls the fuel flow according to the load on the gas turbine 7.

The heater 27 of the fuel supply system 20 which is configured as described above is equipped with: a heating medium supply system 36 which supplies steam or hot water which serves as the heating source for heating the fuel from the fuel reservoir 21; a vent system 37 which releases a noncondensable gas out of the heater, the noncondensable gas being generated during the heat exchange between the fuel from the fuel reservoir 21 and the steam or hot water from the heating medium supply system 36; a draining system 39 which lets the drain (condensed liquid) out of the heater, the drain being generated during the heat exchange between the fuel and the heating medium; and an inert gas supply system 38 which supplies the inert gas such as nitrogen gas or argon gas to protect a heat transfer pipe and other components in the heater from rust while the heater 27 is at rest.

The heating medium supply system 36 is equipped with: a steam source 40 as an auxiliary steam boiler, a heating medium emergency cutoff valve 41 which prevents leaking fuel from flowing into the heating medium source 40 if fuel leakage occurs in the heater 27, and a heating medium regulating valve 42 and a check valve 85 for successfully controlling the volume of heating medium when supplying the heating medium from the heating medium source 40 to the heater 27. The heating medium supply system 40 is equipped with: a fuel pressure detector 43 which is provided on the downstream side of the large pressure reducing valve 29 and the small pressure reducing valve 30 to prevent the fuel in the fuel supply system 20 from partially liquefying due to the Joule-Thomson effect when it goes through the large pressure reducing valve 29 and the small pressure reducing valve 30; and a heating medium controller 45 which supplies a valve open/close signal to the heating medium regulating valve 42 according to a detection signal received from a fuel temperature detector 44 so as to maintain the fuel passing through the heater 27 at the pressure and temperature which prevent the fuel from liquefying.

Figure 2:
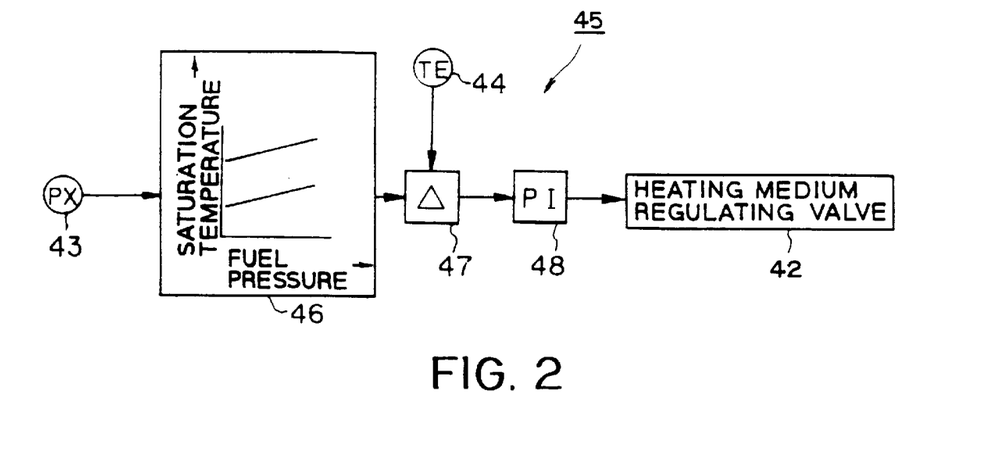
FIG. 2 is a schematic block diagram showing a heating medium controller of the fuel supply control unit for the gas turbine according to the present invention.

As shown in FIG. 2, the heating medium controller 45 is constituted by a function device 46 which calculates a saturation temperature according to a detection signal of the fuel pressure detector 43, a comparator 47 which compares an actual fuel temperature from the fuel temperature detector 44 with the saturation temperature calculated by the function device 46, and an operation element 48 which creates a valve open/close signal according to the deviation given by the comparator 47. The function device 46 provides functions with allowances for a fuel with a higher specific gravity because the specific gravity varies depending on the type of fuel and the saturation temperature varies with specific gravity.

As shown in FIG. 1, the vent system 37 has an exhaust section 52 which discharges a noncondensable gas, which is generated by an impurity included in the heating medium in the heater while heating the fuel, out to, for example, the atmospheric air or a blow tank via a vent emergency cutoff valve 49, a check valve 50, and an orifice 51, a leak fuel detector 53 which detects whether leak fuel has been mixed in the noncondensable gas generated in the heater 27, and a noncondensable gas vent relief valve 54 which discharges the noncondensable gas out to the atmospheric air if the leak fuel has been mixed in the noncondensable gas.

The draining system 39 has a drain regulating valve 55 which controls the level of the drain generated in the heater 27, a drain emergency cutoff valve 56 which prevents the drain from flowing out of the heater if fuel leakage happens in the heater 27, and a check valve 57.

The drain system 39 is also equipped with a drain controller 58, which is provided with a level detector 59 which detects the level of the drain in the heater 27. It opens or closes the drain regulating valve 55 in accordance with the detection signal of the level detector 59, thereby maintaining a proper level of the drain in the heater.

Figure 3:
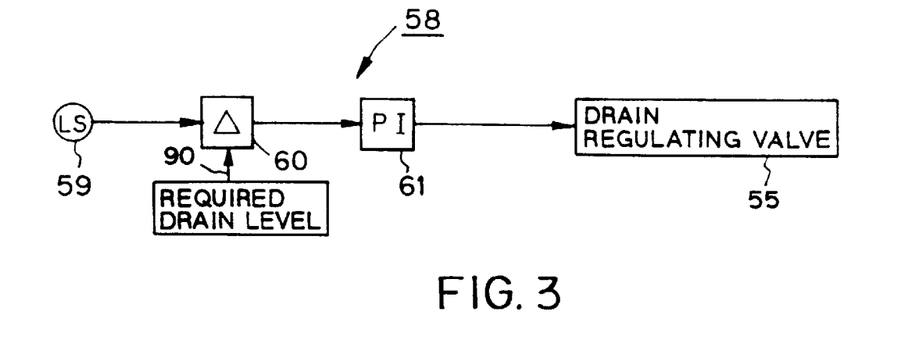
FIG. 3 is a schematic block diagram showing a drain controller of the fuel supply control unit for the gas turbine according to the present invention.

To be more specific, as shown in FIG. 3, the drain controller 58 is equipped with a comparator 60 which compares the level signal of the level detector 59 with a predetermined drain level value 90 which has been entered in a predetermined storage such as a memory and an operation element 61 which creates a valve open/close signal according to the deviation given by the comparator 60 and sends the valve open/close signal to the drain regulating valve 55.

The inert gas supply system 38 is equipped with an inert gas reservoir 62, an inert gas emergency cutoff valve 63 for preventing leak fuel from running back to the inert gas supply system 38 from the heater 27 in case of fuel leakage while the heater 27 is in operation, an inert gas regulating valve 64 for controlling the flow rate when supplying the inert gas from the inert gas reservoir 62 to the heater 27, and a check valve.

Figure 4:
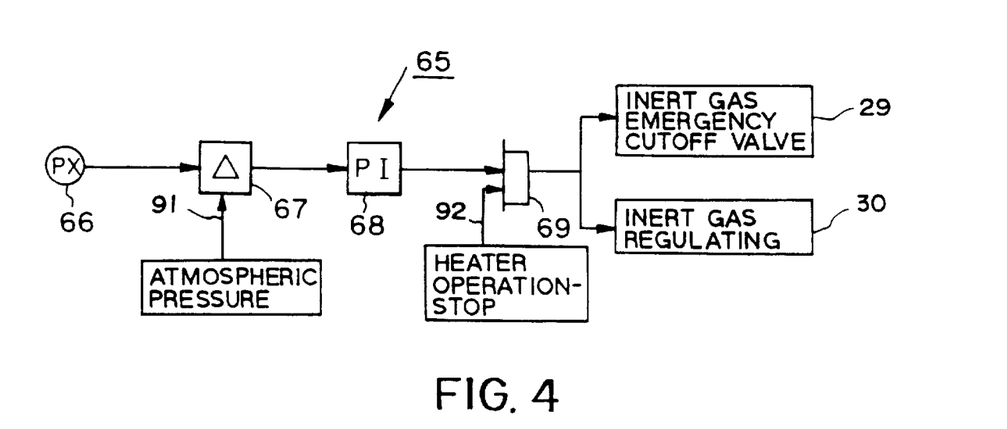
FIG. 4 is a schematic block diagram showing an inert gas controller of the fuel supply control unit for the gas turbine according to the present invention.

The inert gas supply system 38 is provided with an inert gas controller 65, which is equipped with a pressure detector 66 which detects the pressure inside the heater 27 adapted to supply a valve opening signal to the inert gas emergency cutoff valve 63 and the inert gas regulating valve 64 according to the detection signal given by the pressure detector 66. More specifically, as illustrated in FIG. 4, the inert gas controller 65 is configured so that the pressure inside the heater 27 is detected by the pressure detector 66 and a comparator 67 compares the detection signal with an atmospheric pressure signal 91, an operation unit 68 generates a valve opening signal for the inert gas emergency cutoff valve 63 and the inert gas regulating valve 64 when the deviation given by the comparator 67 reaches zero or a negative value, and an AND circuit 69 supplies the valve opening signal to the inert gas emergency cutoff valve 63 and the inert gas regulating valve 64 on condition that both the valve opening signal of the operation unit 68 and a non-operational mode signal 92 of the heater 27 have been issued.

The fuel supply system 20 is provided with a pressure reducing valve controller 70 which supplies an appropriate valve open/close signal to the large pressure reducing valve 29 and the small pressure reducing valve 30 according to the required fuel pressure of the gas turbine 7, a fuel controller 71 which adjusts an actual fuel pressure to suit the required fuel pressure of the gas turbine 7 if the actual fuel pressure is higher than the required fuel pressure of the gas turbine 7, and a fuel leakage emergency processing controller 72 which prevents leak fuel from running into the heating medium supply system 36, the vent system 37, the inert gas supply system 38, and the drain system 39 in case of fuel leakage into the heater 27.

Figure 5:
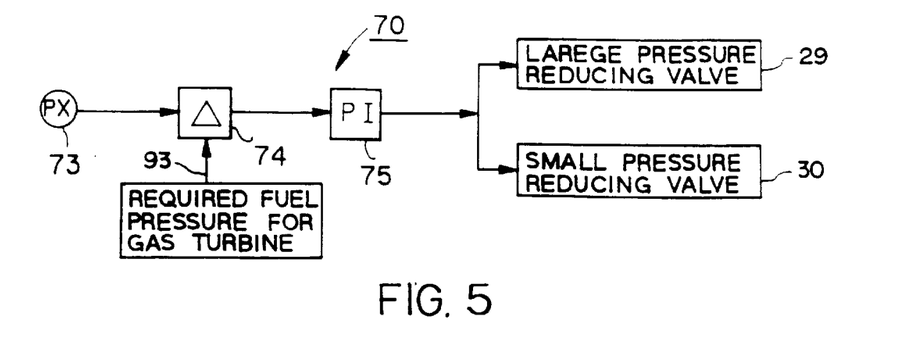
FIG. 5 is a schematic block diagram showing a pressure reducing valve controller of the fuel supply control unit for the gas turbine according to the present invention.

The pressure reducing valve controller 70 functions to supply the valve open/close signal to the large pressure reducing valve 29 and the small pressure reducing valve 30 according to the actual fuel pressure indicated by the fuel pressure detector 73 installed at the inlet end of the gas turbine inlet fuel cutoff valve 34. In an actual structure, the pressure reducing valve controller 70 is equipped, as shown in FIG. 5, with a comparator 74 which compares the signal of an actual fuel pressure detected by the fuel pressure detector 73 with a signal 93 of the required fuel pressure of the gas turbine 7, and an operation unit 75 which creates a valve open/close signal to be supplied to the large pressure reducing valve 29 and the small pressure reducing valve 30 according to the deviation received from the comparator 74.

Figure 6:
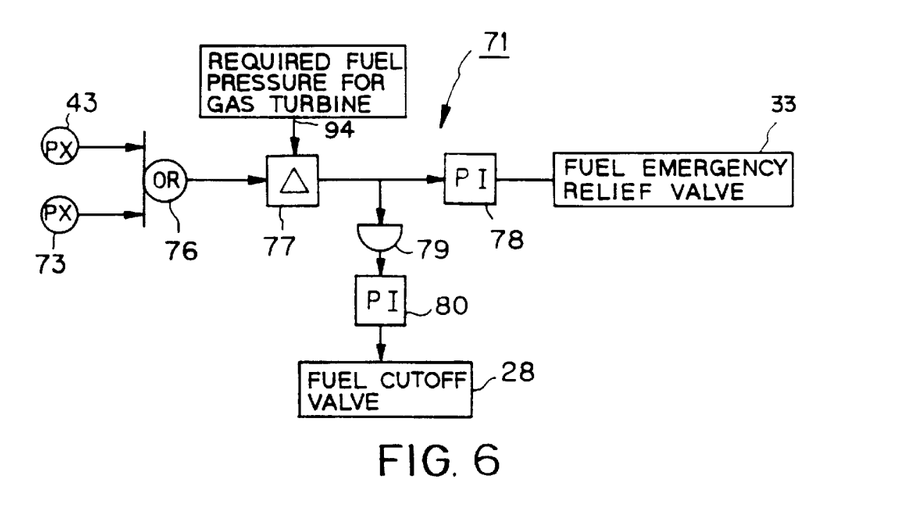
FIG. 6 is a schematic block diagram showing a fuel controller of the fuel supply control unit for the gas turbine according to the present invention.

The fuel controller 71 issues the valve opening signal to the fuel emergency relief valve 33 according to at least either one of the actual fuel pressure detected by the fuel pressure detector 43 provided on the downstream side of the large pressure reducing valve 29 and the small pressure reducing valve 30 or the fuel pressure detector 73 provided at the inlet end of the gas turbine inlet fuel cutoff valve 34 and it also issues the valve closing signal to the fuel cutoff valve 28. As shown in FIG. 6, the fuel controller 71 is equipped with an OR circuit 76 which selects either one of the signal of actual fuel pressure detected by the fuel pressure detector 43 or that detected by the fuel pressure detector 73, a comparator 77 which compares the signal of the actual fuel pressure selected by the OR circuit 76 with the signal 94 of the required fuel pressure of the gas turbine 7, an operation unit 78 which creates the valve opening signal to be supplied to the fuel emergency relief valve 33 according to the deviation given by the comparator 77, and another operation unit 80 which activates a timer circuit 79 and generates the valve closing signal to be supplied to the fuel cutoff valve 28 if the fuel pressure of the fuel supply system 20 remains still higher than the required fuel pressure of the gas turbine 7 even after the fuel has been let out through the fuel emergency relief valve 33 into the atmospheric air.

Figure 7:
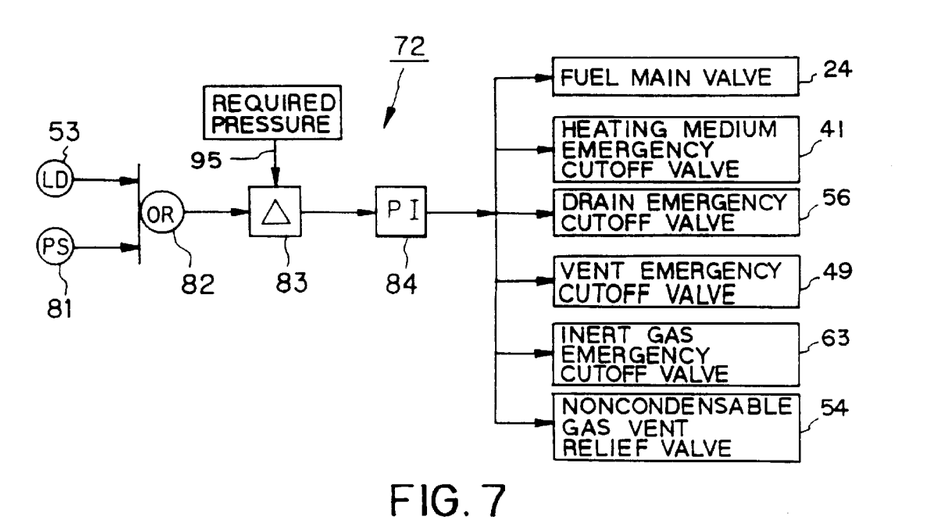
FIG. 7 is a schematic block diagram showing a fuel leakage emergency processing controller of the fuel supply control unit for the gas turbine according to the present invention.

If the pressure detected by a pressure switch 81 provided on the heater 27 or the leak fuel detector 53 of the vent system 37 is higher than a predetermined value, then the fuel leakage emergency processing controller 72 decides that fuel leakage has taken place in the heater 27 and it sends the valve closing signal to all the fuel main valve 24 of the fuel supply system 20, the heating medium emergency cutoff valve 41 of the heating medium supply system 36, the drain emergency cutoff valve 56 of the drain system 39, the vent emergency cutoff valve 49 of the vent system 37, and the inert gas emergency cutoff valve 63 of the inert gas supply system 38, while supplying the valve opening signal to the noncondensable gas vent relief valve 54 of the vent system 37 at the same time. More specifically, as shown in FIG. 7, the fuel leakage emergency processing controller 72 is equipped with an OR circuit 82 which selects either one of a signal detected by the leak fuel detector 53 of the vent system 37 or a signal detected by the pressure switch 81 of the heater 27, a comparator 83 which compares the signal selected by the OR circuit 82 with a predetermined pressure value 95 which has been entered in a predetermined storage such as a memory, and an operation unit 84 which creates the valve closing signal to be supplied to the heating source fuel valve 24, the heating medium emergency cutoff valve 41, the drain emergency cutoff valve 56, the vent emergency cutoff valve 49, and the inert gas emergency cutoff valve 63 and which also creates the valve opening signal to be supplied to the noncondensable gas vent relief valve 54 according to the deviation given by the comparator 83.

The operation based on the structures or arrangements described above will be described hereunder.

Before the gas turbine 7 is started, the stop valve 32 is in a closed state to isolate the fuel supply system 20 and the gas turbine combustor 23, and the fuel in the fuel reservoir 21 has been supplied in the fuel supply system 20. In this case, the fuel pressure is as high as approximately 70 atg, and therefore, the bypass valve 25 is opened to let the fuel flow into the fuel supply system 20 in order to prevent water hammer phenomenon or the like from causing.

Prior to the startup of the gas turbine, the stop valve 32 is opened, and the heating medium is fed from the heating medium source 40 of the heating medium supply system 36 to the heater 27 of the fuel supply system 20 to heat the fuel. The volume of heating medium required for heating the fuel is adjusted by the heating medium controller 45 which issues a command to send the valve open/close signal to the heating medium regulating valve 42 so as to maintain the fuel temperature at a level where the fuel does not partially liquefy (the saturation temperature of the fuel or higher) when the pressure of the fuel is reduced as it will be discussed later.

The fuel which has left the heater 27 is subject to the pressure reducing process through the large pressure reducing valve 29 and the small pressure reducing valve 30 so as to suit the fuel pressure required by the gas turbine 7. The large pressure reducing valve 29 and the small pressure reducing valve 30 are opened or closed by a command issued from the pressure reducing valve controller 70 to reduce the fuel pressure.

There are cases, however, in which the fuel pressure is still higher than the required fuel pressure of the gas turbine 7 even after the fuel pressure has been reduced through the large pressure reducing valve 29 and the small pressure reducing valve 30. Such cases include a first cutback operation (isolated operation in a power station) and the trip of the gas turbine 7. If the first cutback operation or the trip of the gas turbine takes place, the gas turbine inlet fuel cutoff valve 34 is closed and the supply of the fuel to the gas turbine combustor 23 is cut off, causing the fuel supply system 20 to increase transitional abnormal fuel pressure although momentarily. In order to suppress such transitional abnormal fuel pressure increasing, the surge tank 31 is positively located.

In this case, the fuel controller 71 issues a valve opening command to the fuel emergency relief valve 33 to relieve the fuel of the fuel supply system 20 into the atmospheric air. If the fuel pressure lowers to a limited pressure, the fuel controller 71 issues a valve closing command to the fuel emergency relief valve 33. Further, if the fuel pressure still remains high even after such corrective measures for the abnormal fuel pressure have been taken, the fuel controller 71 issues a valve closing command to the fuel cutoff valve 28 to cut off the supply of fuel from the fuel reservoir 21 to the fuel supply system 20.

While the fuel is being heated, the drain and the noncondensable gas are generated in the heater 27. After the heat exchange with the fuel, the drain will have lost the majority of its heat energy, and if it is let stand, it would lead to an abnormal water level with resultant poor efficiency in the heat exchange with the fuel. For this reason, the level detector 59 constantly detects the drain level in the heater 27 and if the detected value exceeds the predetermined drain level value 90, then the drain regulating valve 55 is opened by a command given by the drain controller 58 so as to properly adjust the drain level in the heater 27. Likewise, the noncondensable gas produced in the heater 27 during the fuel heating process also causes poor efficiency of the heat exchange with the fuel. Therefore, the noncondensable gas is sent out through the exhaust section 52 of the vent system 37 to a blow tank, for example, at a compound power plant for the purpose of heat recovery or it is let out as it is into the atmospheric air.

There is a possibility that the fuel leaks due to a corroded heat transfer pipe, a worn sealing, etc. while the drain and noncondensable gas, which have been generated in the heater 27, are being let out of the heater. Since the fuel leakage adversely affects other component equipment, the fuel detector 53 of the vent system 37 constantly checks for leak fuel mixed in the noncondensable gas, and the check for the mixture of the leak fuel in the drain is carried out constantly through the pressure switch 81 mounted on the heater 27. Because the fuel pressure is higher than the drain pressure, if the drain pressure is higher than the predetermined pressure 95, it is considered that the leak fuel has been mixed in.

If the leak fuel detector 53 or the pressure switch 81 detects leak fuel, then the fuel leakage emergency processing controller 72 issues the command to close the fuel main valve 24, the heating medium emergency cutoff valve 41, the drain emergency cutoff valve 56, the vent emergency cutoff valve 49, and the inert gas emergency cutoff valve 63, and to open the noncondensable gas vent relief valve 54 to let the leak fuel out into the atmospheric air, thereby preventing other component equipment from being adversely affected.

While the heater 27 is at rest, the heat transfer pipe of the heater 27 is susceptible to wear due to the air or the like coming in through gaps of the couplings of pipes or the valve rods of various valves or due to the noncondensable gas remaining in the heater. Therefore, it is necessary to provide rustproof measures. For this purpose, the pressure detector 66 mounted on the heater 27 detects the pressure in the heater and if the detected pressure reaches zero or a negative value in comparison with the atmospheric pressure, the inert gas controller 65 issues the command to open the inert gas emergency cutoff valve 63 and the inert gas regulating valve 64 so as to supply the inert gas to the heater 27 from the inert gas reservoir 62 on condition that the heater 27 is in a non-operational mode, thus protecting the heater 27 from rusting.

Figure 8:
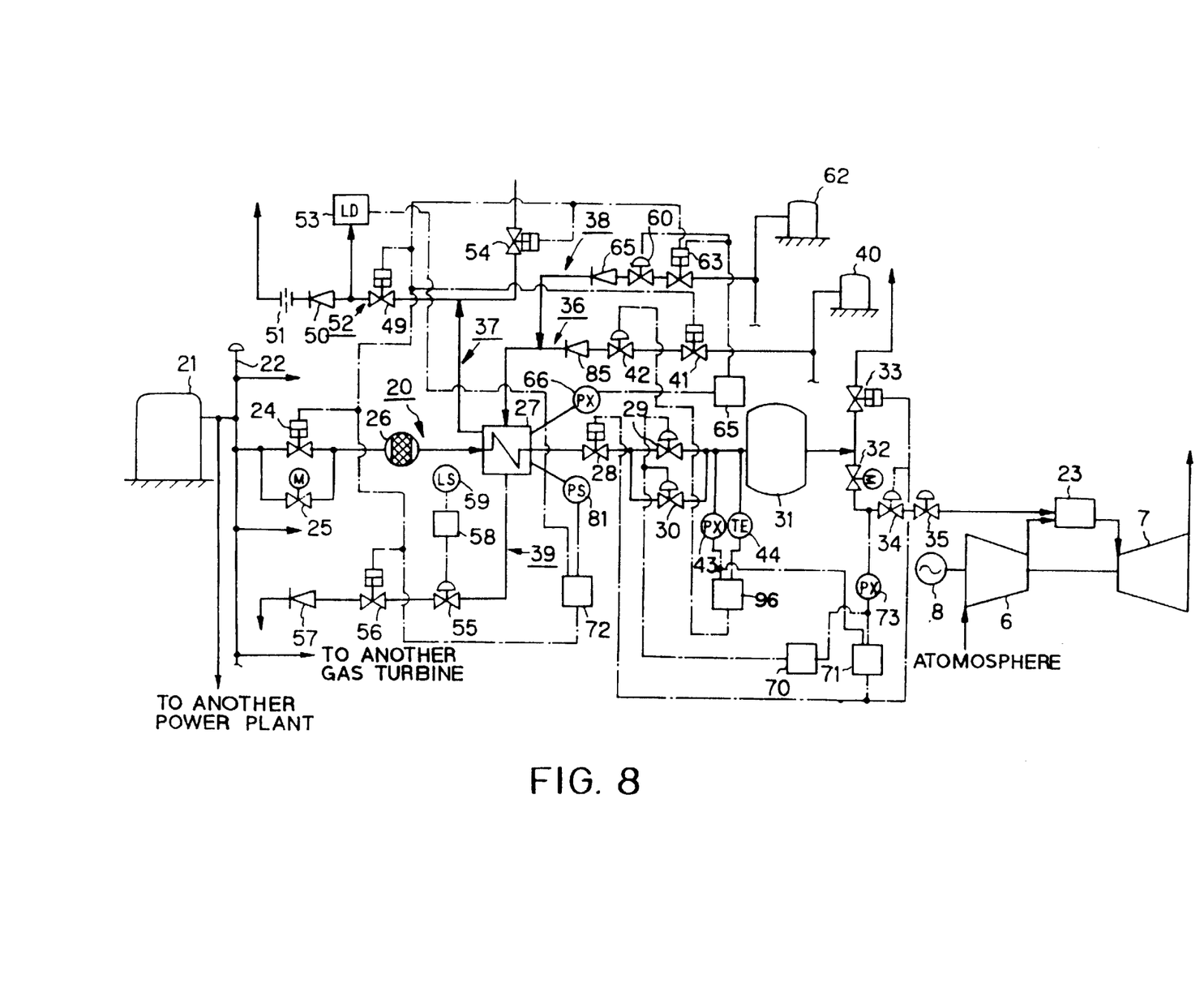
FIG. 8 is a schematic system diagram showing a second embodiment of a fuel supply system and a control unit for the same according to the present invention.

FIG. 8 is a schematic system diagram showing the second embodiment of the fuel supply system for the gas turbine and the control unit therefore according to the present invention, in which like reference numerals are added to members, unit, etc. corresponding to those mentioned with reference to the first embodiment and only the descriptions of structures or arrangements different from those of the first embodiment will developed hereunder.

In the second embodiment, there is arranged a heating medium controller 96 adapted to perform open/close control of the heating medium regulating valve 42 by the temperature change of the fuel passing downstream side of the large pressure reducing valve 29 and the small pressure reducing valve 30.

Figure 9:
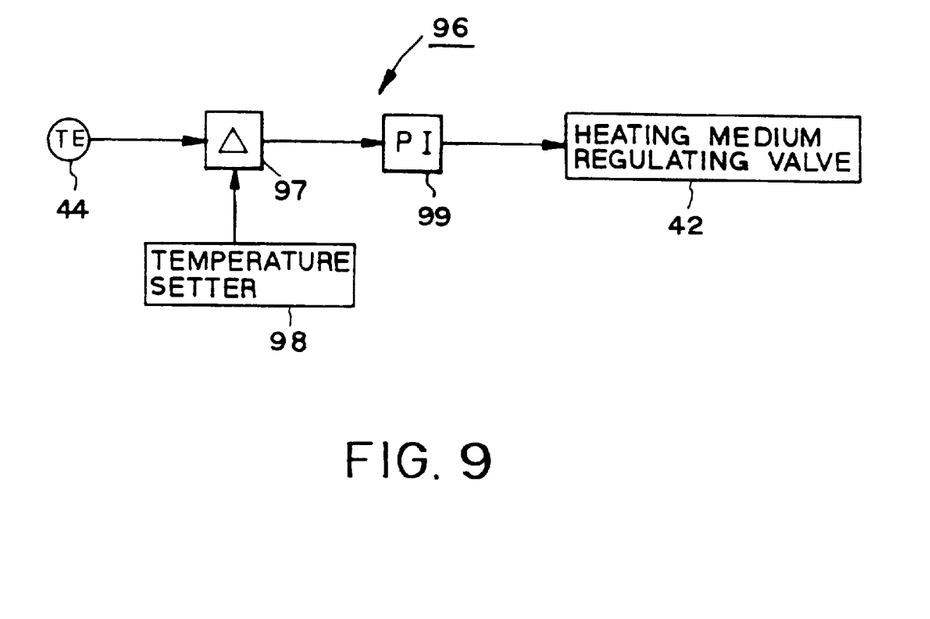
FIG. 9 is a schematic block diagram showing a heating medium controller of the fuel supply control unit of the second embodiment of the present invention.

The heating medium controller 96 functions, as shown in FIG. 9, to detect the temperature of the fuel passing through the large pressure reducing valve 29 and the small pressure reducing valve 30 by the fuel temperature detector 44, and a temperature detecting signal is compared with a signal preset by a comparator 97 and generated from a temperature setter 98. When a deviation between these signals exists, a deviation signal is calculated in an operation unit 99 through a proportional-plus-integral (PI) operation to thereby send a valve open/close signal and hence to control the open/close operation of the heating medium regulating valve 42. Further, under the provision that the fuel pressure is reduced to a predetermined pressure value by the large pressure reducing valve 29 and the small pressure reducing valve 30, the a temperature over a dew point corresponding to the reduced pressure is inputted as a set temperature in the temperature setter 98.

As described above, according to the second embodiment, since the valve open/close control of the heating medium regulating valve 42 is performed through the fuel temperature by the heating medium controller 96, the structure is made compact and simple and the fuel stable control with less trouble can be ensured.

Figure 10:
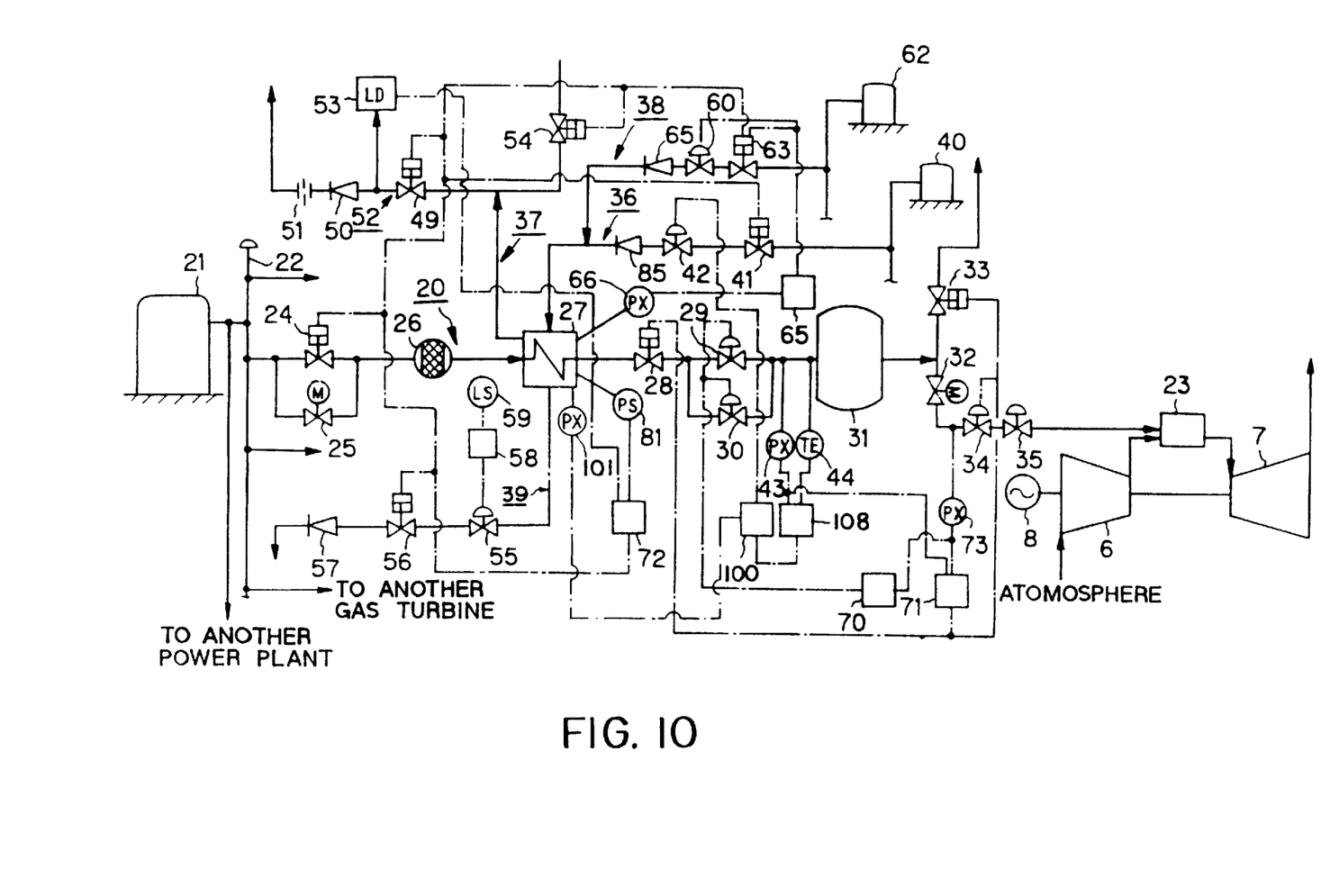
FIG. 10 is a schematic system diagram showing a third embodiment of a fuel supply system and a control unit for the same according to the present invention.

FIG. 10 is a schematic system diagram showing the third embodiment of the fuel supply system for the gas turbine and the control unit therefore according to the present invention, in which like reference numerals are added to members, unit, etc. corresponding to those mentioned with reference to the first embodiment and only the descriptions of structures or arrangements different from those of the first embodiment will developed hereunder.

This third embodiment is specifically equipped with a valve opening degree operation unit 108 for supplying a valve open/close signal to the heating medium regulating valve 42 in accordance with the inner pressure of the heater 27 and the pressure and temperature of the fuel passing downstream side of the large pressure reducing valve 29 and the small pressure reducing valve 30 and also equipped with a heating medium controller 100 for controlling the heating medium regulating valve 42 with the limitation to a valve open/close signal created from the valve opening degree operation unit 108.

The fuel supply system 20 does not require the heating of the fuel by the heater 27 in a summer season at which the temperature of the fuel is itself increased. For this reason, in a high temperature such as in the summer season, in the fuel supply system 20, the heating medium regulating valve 42 is fully opened, and the fuel, in a no heated state, is supplied to the gas turbine combustor 23 to perform the fuel supply operation.

However, during the fuel supply operation, the drain is generated in the heater 27 and there causes several times at which the temperature of the drain becomes less than 100° C. For this reason, the inner pressure of the heater 27 becomes saturation pressure corresponding to the drain temperature, so-called vacuum state of a pressure less than the atmospheric pressure. In such case, there may cause a state that air invades into the heater 27 through a flanged portion such as of the piping, which may results in corrosion of the heat transfer tube and causing fuel leaking in an adverse case.

In this embodiment, in view of such defects, a pressure detector 101 for detecting the inner pressure of the heater 27 is arranged. The heating medium regulating valve 42 is opened or closed in response to a pressure signal from the pressure detector 101 and signals from the fuel pressure detector 43 and fuel temperature detector 44 which detect the pressure and the temperature of the fuel, respectively. In addition, the heating medium controller 100 is arranged to maintain the inner pressure of the heater 27 to a pressure value more than the atmospheric pressure in consideration of the valve opening degree of the heating medium regulating valve 42.

Figure 11:
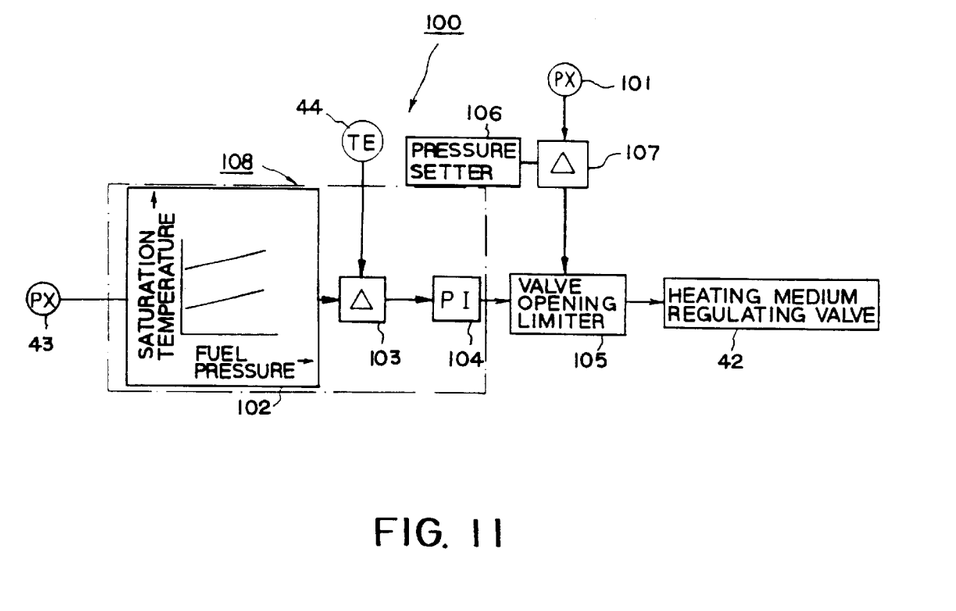
FIG. 11 is a schematic block diagram showing a heating medium controller of the fuel supply control unit of the third embodiment of the present invention.

The heating medium controller 100 is equipped with a valve opening degree operation unit 108 which functions, as shown in FIG. 11, to detect the fuel pressure through the fuel pressure detector 43, and the detected pressure signal is calculated in a function device 102 as saturation temperature. A saturation temperature signal is compared by a comparator 103 with an actual fuel temperature signal from the fuel temperature detector 44. When a deviation exists therebetween, a deviation signal is operated through the PI operation in an operation unit 104 to thereby create the valve open/close signal. The heating medium controller 100 is further equipped with a valve opening degree limiter 105 which serves to give a limitation to the valve open/close signal from the valve opening degree operation unit 108. In the valve opening degree limiter 105, there is inputted an actual inner pressure operation signal detected and operated by the pressure detector 101 which detects the inner pressure of the heater 27. The actual inner pressure operation signal is compared with a set pressure signal, from a pressure setter 106, preliminarily set a pressure more than the atmospheric pressure by the comparator 107, and in a case of any deviation, a deviation signal is inputted into the valve opening degree limiter 105.

The valve opening degree limiter 105 serves to create the valve open/close signal in response to the operation signal from the valve opening degree operation unit 108 and the operation signal from the comparator 107 and to perform the valve open/close control of the heating medium regulating valve 42.

As described above, according to this embodiment, the heating medium is supplied from the heating medium regulating valve 42 to the heater 27 so as to prevent the heater from causing the vacuum state in a high temperature condition such as summer season to thereby maintain the inner pressure of the heater 27 to a pressure more than the atmospheric pressure. This operation is performed by the heating medium controller 100, and accordingly, no air invades into the heater 27 and, hence, any corrosion due to the air to the heat transfer tube can be prevented and the fuel leaking can be surely prevented.

It is to be noted that the present invention is not limited to the described embodiments and many other changes or modifications may be made without departing from the scopes of the appended claims.

What is claimed is:

1. A fuel supply control unit for a gas turbine comprising:
   a fuel supply system for sending fuel in a fuel reservoir to a plurality of gas turbine combustors;
   a heater provided for the fuel supply system for heating the fuel;
   a pressure reducing means and a gas turbine combustor inlet fuel cutoff valve means disposed on a downstream side of the heater; and
   a pressure reducing means controller which detects an inlet fuel pressure of the gas turbine combustor inlet fuel cutoff valve means and applies a pressure reduction control signal to the pressure reducing means if a detected pressure is higher than a required fuel pressure of the gas turbine.

2. A fuel supply control unit for a gas turbine according to claim 1, wherein the pressure reducing means controller includes a comparator which compares a signal of an actual inlet fuel pressure of the gas turbine combustor inlet fuel cutoff valve with a signal of a required fuel pressure of the gas turbine and an operation unit which produces the pressure reduction control signal to the pressure reducing means in accordance with a deviation between compared signals given by the comparator.

* * * * *